United States Patent [19]

Rosenthal et al.

[11] Patent Number: 5,224,212
[45] Date of Patent: Jun. 29, 1993

[54] ASYNCHRONOUS OPERATION IN A DATABASE MANAGEMENT SYSTEM

[75] Inventors: Robert S. Rosenthal, Schaumburg; Valentin Oprescu, Glenview, both of Ill.

[73] Assignee: Motorola, Inc., Schaumburg, Ill.

[21] Appl. No.: 345,586

[22] Filed: May 1, 1989

[51] Int. Cl.$^5$ .................................... G06F 13/00
[52] U.S. Cl. .................................. 395/250; 395/600; 364/DIG. 2; 364/939; 364/926.1; 364/926.2; 364/950; 364/950.1
[58] Field of Search ... 364/200 MS File, 900 MS File; 395/600, 250

[56] References Cited

U.S. PATENT DOCUMENTS 4,823,304  4/1989  Frantz et al. .................. 364/900

OTHER PUBLICATIONS

"An Introduction to Database Systems," Chapter 18, by C. J. Date–1986.

Primary Examiner—Paul V. Kulik
Attorney, Agent, or Firm—Walter W. Nielsen

[57] ABSTRACT

A real-time database management system in which data generated by a producer process is buffered in a plurality of update buffers and transmitted asynchronously into a consumer process, such as a database management system, so that neither the producer process nor the consumer process has to halt operations during I/O requests and data is not lost.

9 Claims, 3 Drawing Sheets

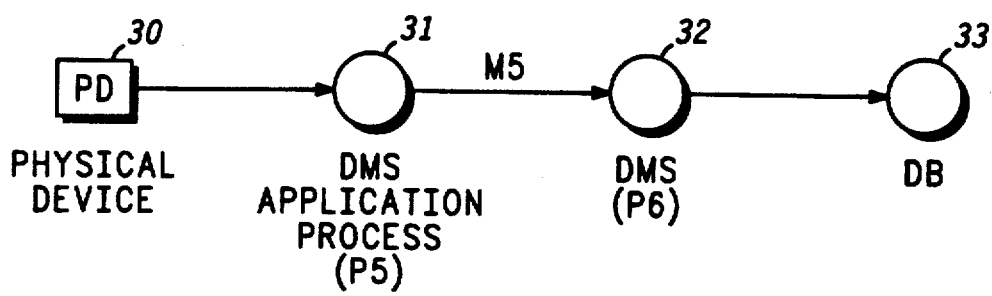
FIG. 4
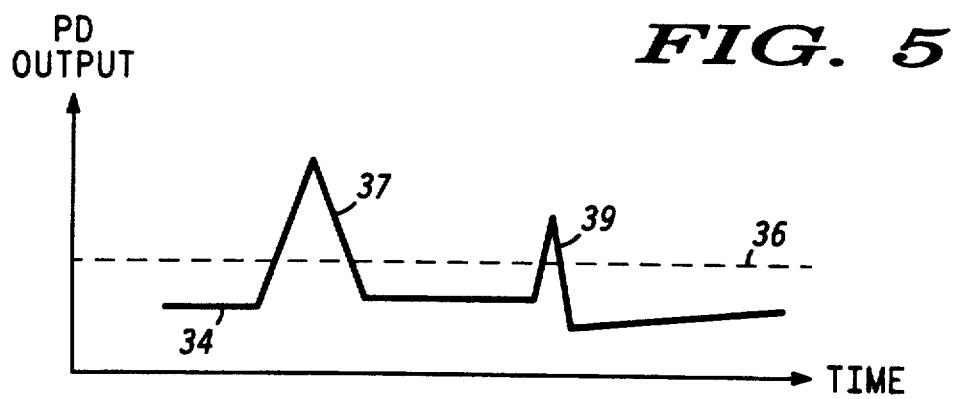
FIG. 5
FIG. 6
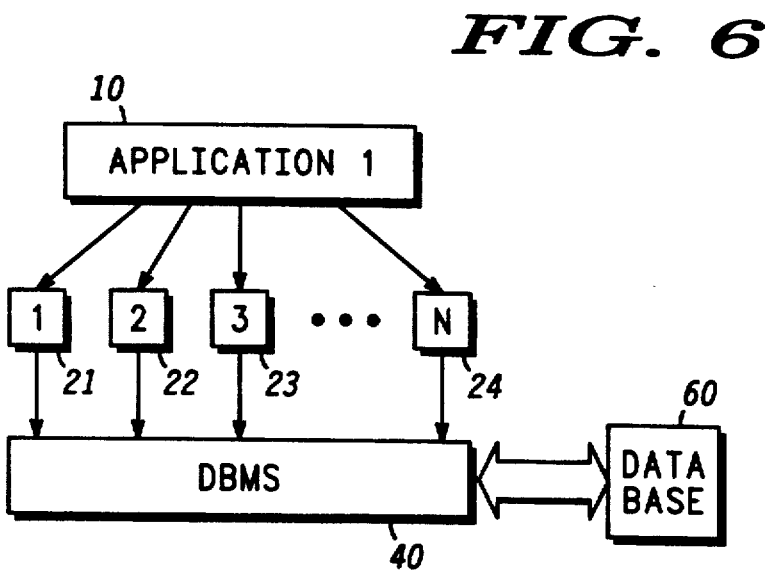

ASYNCHRONOUS OPERATION IN A DATABASE MANAGEMENT SYSTEM

COPYRIGHT PROTECTION

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

RELATED INVENTIONS

The present invention is related to the following inventions, all assigned to the assignee of the present invention:

"Computer System with Data Residency Transparency and Data Access Transparency", invented by Andrew Kun, Frank Kolnick, and Bruce Mansfield, having Ser. No. 07/300,687, filed Jan. 19, 1989, now Pat. No. 5,014,192, this application being a continuation of U.S. Ser. No. 110,614 and 730,929, now abandoned;

"Method of Inter-Process Communication in a Distributed Data Processing System", invented by Bernhard Weisshaar, Andrew Kun, Frank Kolnick, and Bruce Mansfield, having U.S. Pat. No. 4,694,396, issued Sep. 15, 1987;

"Virtual Single Machine with Message-Like Hardware Interrupts and Processor Exceptions", invented by Andrew Kun, Frank Kolnick, and Bruce Mansfield, having Ser. No. 730,922, filed May 6, 1985, now U.S. Pat. No. 4,835,685.

"Process Creation and Termination Monitors For Use in a Distributed Message-Based Operating System", invented by Leslie Gabor Seymour, having Ser. No. 649,247, filed Jan. 31, 1991, now U.S. Pat. No. 5,060,150, this application being a continuation of Ser. No. 476,115, Ser. No. 336,630, and Ser. No. 000,624, now abandoned.

"Distributed Computer System with Network and Resource Status Management", invented by Leslie Gabor Seymour, having Ser. No. 294,037, filed Jan. 6, 1989, now U.S. Pat. No. 5,109,486; and "Distributed Computer System with Process Status Monitoring", invented by Leslie Gabor Seymour, having Ser. No. 318,101, filed Mar. 2, 1989, now abandoned.

TECHNICAL FIELD

The present invention relates, in general, to databases and database management systems (DBMS) and, more particularly, to a method for the asynchronous operation of a real-time database.

BACKGROUND OF THE INVENTION

A database management system is a software application whose function is to interface between a database and any applications/processes requesting access to the database. In general, a database management system provides for the organization of, access to, and control of a database.

A database is a collection of logically organized data items. A database is organized into tables, each table having one or more records contained therein. Each record, in turn, is divided into one or more fields. From a visual perspective, the table may be referred to as a view. The rows of a view are related to the records of the database. The columns of a view are related to the fields of the records. The terms "record" and "row" will be used interchangeably herein, as will the terms "field" and "column".

Referring initially to FIG. 1, a visual representation of a database table, generally designated 10 is illustrated. As shown, table 10 is visually represented by a base view generally designated 20. Table 10 comprises records 11 which are divided into fields 12. In base view 20 the rows 21 and columns 22 correspond to records 11 and fields 12, respectively.

The present invention, while applicable to any database environment, has been implemented in a distributed real-time data processing system comprising two or more data processing systems which are capable of functioning independently but which are so coupled as to send and receive messages to and from each other.

A local area network (LAN) is an example of a distributed data processing system. A typical LAN comprises a number of autonomous data processing "nodes", each comprising at least a processor and memory. Each node is capable of conducting data processing operations independently. In addition, each node is coupled to a network of other nodes which may be, for example, a loop, star, tree, etc., depending upon the design considerations.

A "process", as used herein, is a self-contained package of data and executable procedures which operate on that data, comparable to a "task" in other known systems. Within the present invention a process can be thought of as comparable to a set (module) of subroutines in terms of size, complexity, and the way it is used. The difference between processes and subroutines is that processes can be created and terminated dynamically and can execute concurrently with their creator and other sets (modules) of "subroutines".

Every process in the distributed data processing system of the present invention has a unique identifier connector by which it can be referenced. The connector is assigned by the system when the process is created. The connector is used by the system to physically locate the process.

Every process also has a non-unique, symbolic "name", which is a variable-length string of characters. In general, the name of a process is known system-wide. To restrict the scope of names, the concept of a "context" is utilized. This concept is described in detail in copending U.S. patent applications having Ser. Nos. 000,621 and 000,624 referenced above. Basically, a context is a collection of related processes whose names are not known outside of the context.

A process in one context cannot symbolically communicate with, and does not know about, processes inside other contexts. All interaction across boundaries is by means of messages and is gated through a "context process".

A "message" is a variable-length buffer containing data which tells a process what to do and/or supplies it with information it needs to carry out its operation. Messages are queued from one process to another by name or connector. Queuing avoids potential synchronization problems and is used instead of semaphores, monitors, etc. The sender of the message is free to continue after the message is sent. When the receiver attempts to get the message, it will be suspended until one arrives if none are already waiting in its queue. Optionally, the sender can specify that it wants to wait for a reply and is suspended until the specific message arrives. Messages from any other source are not dequeued until after that happens.

Messages provide the mechanism by which user transparency is achieved. A process located anywhere in the system may send a message to any other process anywhere within the system if the sending process has the receiving process's name or connector. This permits processes to be dynamically distributed across the system at any time and to gain optimal throughput without changing the processes to which they are referenced. Sending messages by connector obviates the need for a name search and ignores context boundaries. This is the most efficient method of communicating.

In the present invention messages generally comprise a message ID and one or more "triples". The message ID is a word describing the purpose of the message (e.g. status) or the request (e.g. GET) encoded in it. A triple is a data portion comprising three fields. The first field generally identifies the type of triple. The second field indicates how many bytes of information are contained in the third field, which may be zero (0). The third field contains the data of the message, such as a process status code.

FIG. 2 shows a schematic representation illustrating a prior art database transaction. Known synchronous database management systems do not function effectively to support real-time applications. In a known database management system, a real-time application process, such as Producer process P1 in FIG. 2, generates data. Process P1 sends a message m1 to Consumer process P2. In the system shown in FIG. 2, Producer process P1 then suspends its operation until Consumer process P2 returns a message m2. During the time Producer process P1 was suspended, no data was being received from it. This known type of database management system is referred to as a synchronous database management system.

FIG. 3 shows a schematic representation illustrating an asynchronous database transaction according to the present invention. According to the present invention, which is capable of operating in either a synchronous or an asynchronous mode, when a Producer process such as process P3 in FIG. 3 sends a message m3 to Consumer process P4, Producer process P3 does not have to suspend its operation. It can continue to process data while waiting for Consumer process P4 to handle messages transmitted to it. When Consumer process P4 has formulated a reply message m4, it sends it to a "mailbox" 5 associated with Producer process P3. Producer process P3 may read reply message m4 from mailbox 5 when it has an opportunity.

FIG. 4 shows a schematic representation illustrating a database transaction in greater detail according to the present invention. A Physical Device (PD) 30 generates data to a database management system application process 31, which sends related information in the form of a message m5 to database management system 32. Database management system 32 controls the storage and retrieval of related information in database 33.

FIG. 5 shows a graph of physical device (PD) data output versus time. The real-time data output of PD 30 is represented by fluctuating line 34. Dotted line 36 represents the ability of DMS 32 (the Consumer process) to process and store information in DB 33. The problem with prior art database management systems, such as that shown in FIG. 1, is that the Consumer process was incapable of handling peak data outputs or "bursts" 37 and 39 from the Producer process, so such data was lost.

Thus there is a need to provide in a real-time database management system the capability of operating in an asynchronous mode, so that a Producer process can send data to a Consumer process, especially during peaks or bursts of data being transmitted by the Producer process to the Consumer process, so the Producer process and the Consumer process can continue processing without halting their operations.

In the present invention, data sent by a Producer process to a Consumer process is buffered, for example in high speed memory, so that no data is lost.

Asynchronous processing and the use of buffer stores are known in the data processing arts, particularly in teleprocessing and in file-oriented applications. However, the employment of asynchronous processing techniques in the field of real-time database management systems is not presently known.

With the asynchronous real-time database management system herein disclosed, in which earlier transmitted data may be buffered simultaneously with later transmitted data, there exists a potential for confusing early data with later data. Therefore, there is a need to identify or "tag" the data which is stored in the buffers. In addition, there is a need to generate a notification to either or both the Producer process and the Consumer process of any error occurring in the data transfer operation.

Accordingly, it is an object of the present invention to provide a method for operating a real-time database management system in an asynchronous mode that overcomes the above deficiencies.

A further object of the present invention is to provide a method for tagging information emanating from a specific Producer process.

These and other objects are achieved in accordance with a preferred embodiment of the invention by providing in a database management system, a method for receiving and storing data in a database comprising the steps of: a) receiving a first portion of the data; b) placing the first portion of the data in a first of a plurality of data buffers; c) transferring the first portion of data from the first buffer into the database while receiving a second portion of the data and placing the second portion of the data in a second of a plurality of data buffers; and d) transferring the second portion of data from the second buffer into the database.

BRIEF SUMMARY OF THE INVENTION

A particular embodiment of the present invention comprises a method of operating a real-time database management system asynchronously. Data generated by a producer process is buffered in a plurality of update buffers and is transmitted asynchronously into a database under the control of the database management system, so that neither the Producer process nor the Consumer process has to halt operations and data is not lost.

BRIEF DESCRIPTION OF THE DRAWINGS

FIG. 4 shows a schematic representation illustrating a database transaction in greater detail according to the present invention.

FIG. 5 shows a graph of the ability of a Consumer process to handle physical device (PD) output over time.

FIG. 6 shows a schematic block diagram illustrating a preferred embodiment of the present invention.

DETAILED DESCRIPTION OF THE INVENTION

Referring now to FIG. 6, a schematic block diagram illustrating a preferred embodiment of the present invention is shown.

Real-time application process 10 (here, a Producer process) desires to transmit data to the database management system (DBMS) 40 for subsequent storage into database 60. A plurality of temporary storage buffers #1-#N are provided between application process 10 and DBMS 40.

When application process 10 desires to send data to DBMS 40, data from application 10 is first transmitted to buffer #1. When buffer #1 is full, data is transmitted to buffer #2, while buffer #1 begins emptying into DBMS 40. At high data rates from application process 10, several buffers may be required, in which case a suitable number of buffers #1-#N is provided. The number of buffers allocated depends upon the maximum number of concurrently outstanding update requests expected from application process 10. Available buffers are filled while full buffers are successively emptied into DBMS 40.

Figure 1:
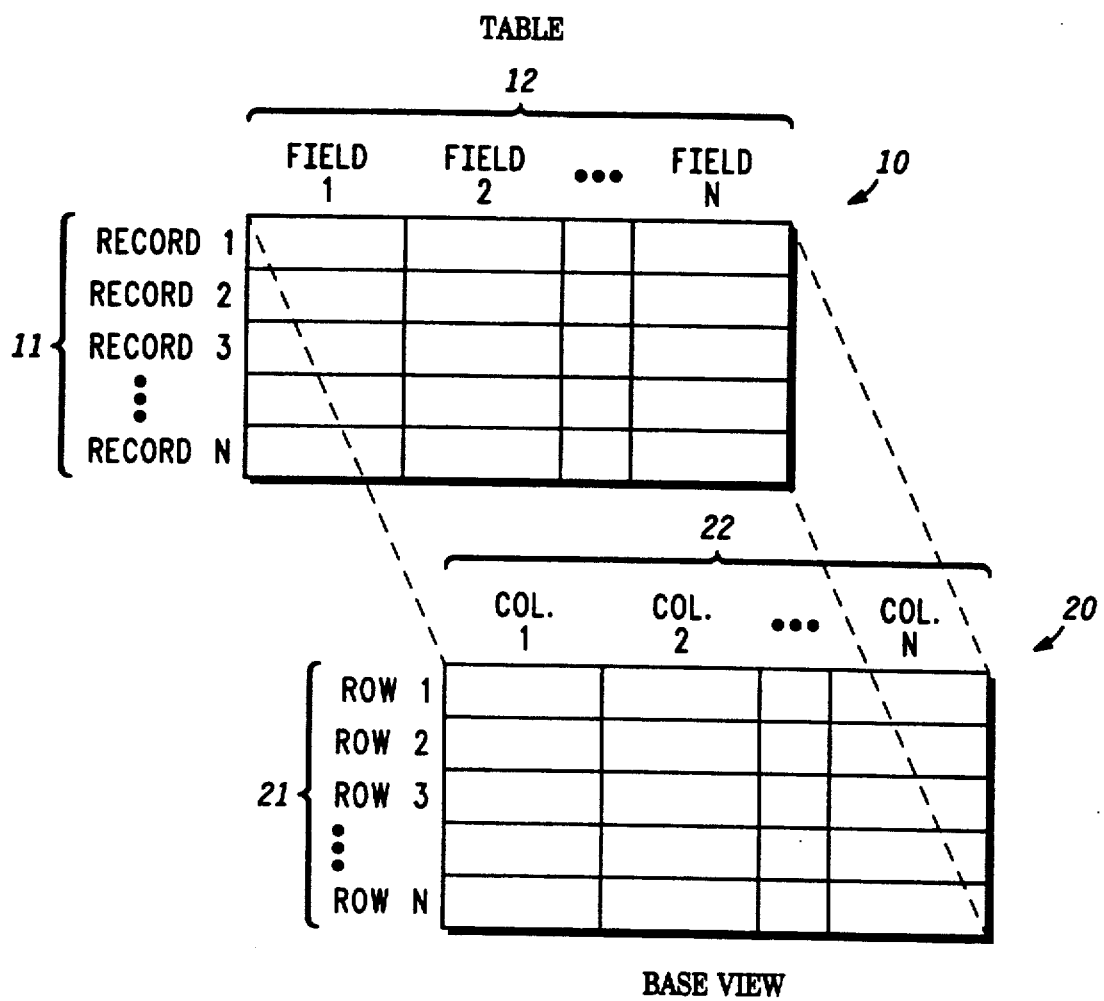
FIG. 1 shows a visual representational of a database table in block form.
Figure 2:
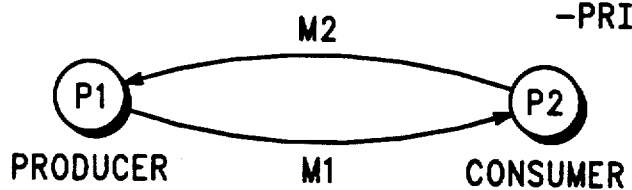
FIG. 2 shows a schematic representation illustrating a prior art database transaction.
Figure 3:
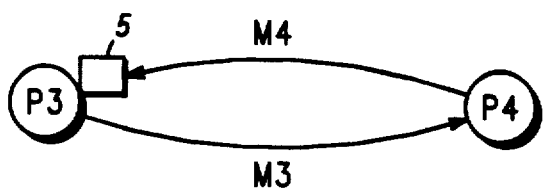
FIG. 3 shows a schematic representation illustrating a database transaction according to the present invention.
Figure 7:
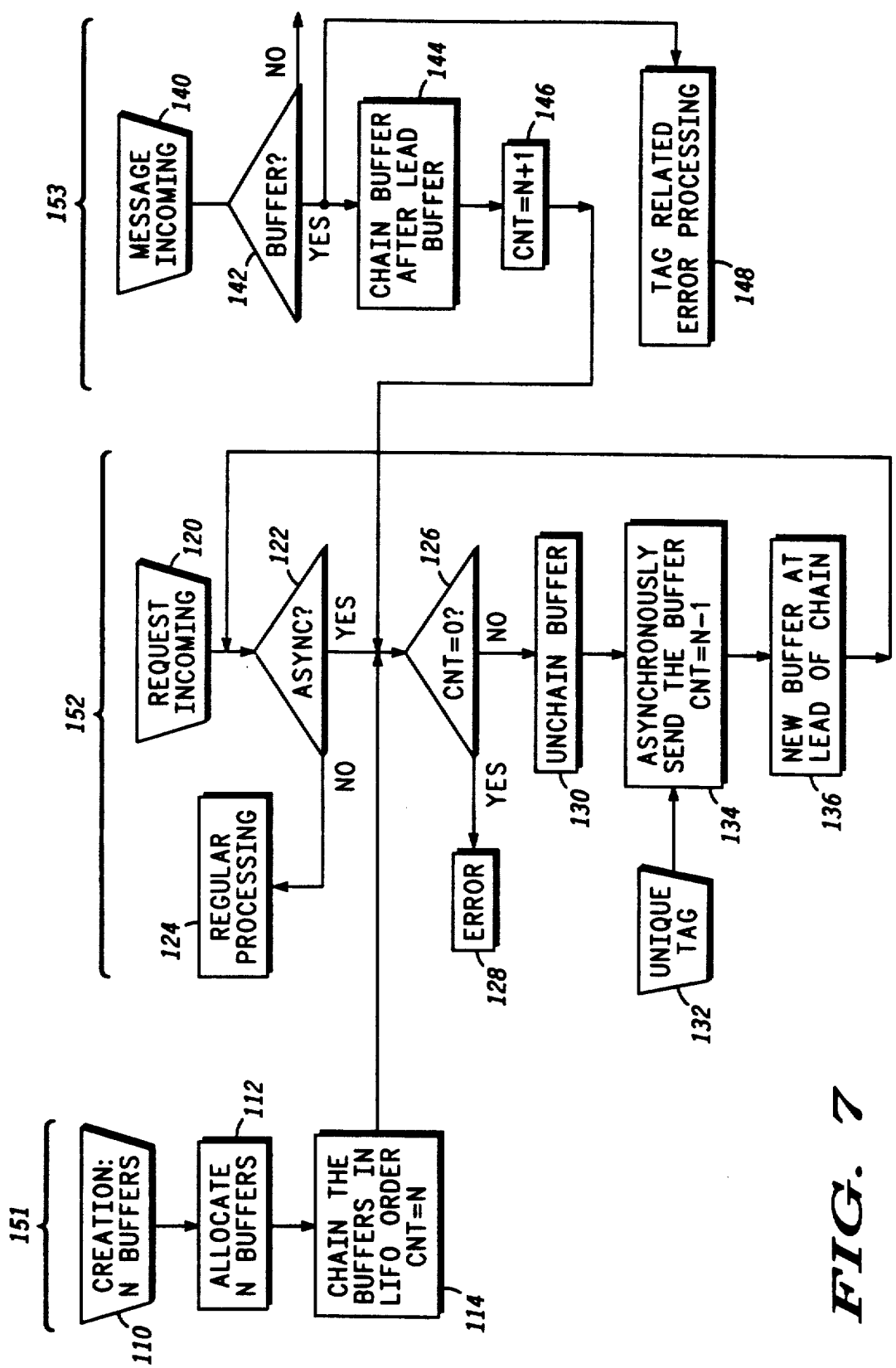
FIG. 7 shows a flow chart of a preferred method of implementing the present invention.

FIG. 7 shows a flow chart of a preferred method of implementing the present invention. The flowchart comprises three basic sections: a "buffer creation" phase represented by portion 151; an "incoming request processing" phase represented by portion 152; and a "buffer recovery phase" represented by portion 153.

In the "buffer creation" phase, represented by portion 151 of FIG. 7, N buffer are created, allocated, and chained, and the count is set to N. In box 110 N buffers are created in main memory. Next in box 112 the N buffers are allocated. Next in box 114 the buffers are chained in a "last-in-first-out" order, and the count is set equal to N. The above functions are shown in lines 210 through 249 of Program Listing A.

In the "incoming request processing" phase, represented by portion 152 of FIG. 7, the processing of incoming requests is shown. An incoming database access request (box 120) is evaluated in decision box 122. If the incoming request is for "asynchronous mode" the process continues with decision box 126, but, if not, it continues with "regular processing" (box 124).

In decision box 126, if the count equals zero, the process proceeds to box 128, indicating an error has occurred, but if the count is not equal to zero, the process proceeds to box 130, where the buffer is unchained. Next in box 134 the buffer is sent asynchronously, and the count is set equal to N−1. Also a unique tag is assigned to the data in the buffer (box 132). From box 134 the process proceeds to box 136, where a new buffer is placed at the lead of the chain.

The processing of an asynchronous request is shown in line 214 of Program Listing B. Unchaining is shown in lines 175-176. Count updating is shown by line 215.

In the "buffer recovery phase", represented by portion 153 of FIG. 7, in response to an incoming message (box 140) a buffer is identified (decision box 142); if a buffer is identified, the process goes to box 144, where the buffer is chained after the lead buffer, and to box 148, where tag-related error-processing is performed. After the buffer is chained to the lead buffer in box 144, the count is incremented by 1 (box 146), and the process proceeds to decision box 126 of the "incoming request processing" phase.

Buffer identification is shown by lines 78-79 of Program Listing C. Chaining is shown by lines 86, 87, 108, and 109. Count incrementing is shown by line 113.

Regarding the tagging of data, if a transmission error occurs while application process 10 (FIG. 6) is transmitting data into one of buffers 21-24, such error will be associated with the data stored in the corresponding buffer through the use of the tag. In a preferred embodiment a tag value may be any four-byte, even-aligned datum, such as a long int or pointer. The specific value and its significance are left to the application process.

DESCRIPTION OF PROGRAM LISTINGS

Program Listings A-C provide the programming code for implementing the flow chart shown in FIG. 7. The listings contain a "C" language implementation of the asynchronous operation of a real-time database, in accordance with a preferred embodiment of the present invention.

Program Listing A includes the "buffer creation" phase represented by portion 151 of the flowchart of FIG. 7.

Program Listing B includes the "incoming request processing" phase represented by portion 152 of the flowchart of FIG. 7.

Program Listing C includes the "buffer recovery phase" represented by portion 153 of the flowchart of FIG. 7.

The correlation between the functions shown in the flow chart of FIG. 7 and the corresponding portions of the code is given above regarding the description of FIG. 7.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

PROGRAM LISTING A

```
1  /***************************************************************
2
3      Copyright 1987. All Rights Reserved Computer X Inc.
4
5      This software is provided to the purchaser under a license which
6      forbids reproduction in whole or in part except as provided in
7      writing by Computer X Inc.
8
9      Module          : opencursor.c 1.4  opencursor.c
10     Date submitted  : 89/03/10 23:37:59
11     Author          : Valentin Oprescu
12     Origin          : cX
13     Description     : DMS application library: open a cursor.
14
15 ****************************************************************/
16 #ident "@(#) opencursor.c:1.4"
17
18 #include <memory.h>
19 #include <string.h>
20 #include <ctype.h>
21 #include <cX.h>
22 #include <dms.h>
23 #include <dms_codes.h>
24 #include <dm/dmsbase.h>
25 #include <dm/dmsadef.h>
26 #include <dm/dmswhere.h>
27 /*>
28 ****************************************************************
29 *
30 *    procedure name: OpenCursor
31 *    ==============
32 *
33 * return value: pointer to cursor if success, NULL if failure;
34 * ------------
35 *
36 * functional description: see IFG.
37 * ----------------------
38 *
39 * side effects: None.
40 * ------------
41 *
42 * residence: DMS application library.
43 * ---------
44 *
45 * release compatibility:
46 * ---------------------
47 *
48 * written by              date
49 * ----------              ----
50 * V. Oprescu              05/19/87
51 *
52 * modified by             date        SPR#        reason for modification
53 * -----------             ----        ----        -----------------------
54 */
55
56 CURSOR *OpenCursor( vcb, rdsize, options, updatenum, updatesize )
57
58     VCB     *vcb;                       /* vcb of the view */
59     int32   rdsize;                     /* size of the read buffer */
60     uint32  options;                    /* various dispositions */
61     uint32  updatenum;                  /* number of update buffers */
62     uint32  updatesize;                 /* size of the update buffer */
63
64 /****************************************************************
65 <*/
66 {
67     TRACE("OpenCursor")
68     VCB         *vcbptr;                /* pointer to vcb */
69     CURSOR      *cursor;                /* cursor pointer */
70     CURSOR      *prevcursor;            /* pointer to previous cursor */
71     register DMSBUF *bufp;              /* pointer to buffer */
72     DMSBUF      *prevbufp;              /* pointer to previous buffer */
73     uint32      size;                   /* size of buffer to allocate */
74     uint16      bulknum=0;              /* number of bulk columns in view */
```

```
75
76   char    *strcpy();
77   char    *memset();
78   bool    FastWhere();
79
80   dbstatus.dbexception= dbstatus.dberror= 0;
81   dbstatus.dbimmediate= TRUE;
82
83   if( anchor.streamcnt < 0 && (options & D_FORCE) != 0 ) ERR( DME_RESTRICT )
84
85   cursor= NULL;
86
87   /* check the validity of the vcb */
88   dbstatus.dbparm= 1;
89   /* look for vcb among the opened views */
90   if( vcb == NULL) ERR(DME_BADVCB)
91   vcbptr = (vcb->arb)->vcbloc;
92   while( vcbptr != NULL ) {
93     if( vcbptr == vcb ) break;
94     vcbptr = vcbptr->next;
95   }
96   if( vcbptr == NULL) ERR(DME_BADVCB)
97
98   /* check the options */
99   (dbstatus.dbparm)= 3;
100  if( (options & -( SUSP | D_DELETE | D_SELECT |
101                  D_INSERT | D_UPDATE | D_FORCE )) != 0 ) ERR( DME_BADOPT )
102
103  if( (options & -( SUSP | D_FORCE )) == 0 ) ERR( DME_INCOMP )
104
105  if( (options & ( D_DELETE | D_INSERT | D_UPDATE )) != 0 &&
106     (vcb->dmmsg.flags & D_UPDATE ) == 0 ) ERR( DME_RDONLY )
107
108  if( ( options & D_DELETE ) != 0 && ( vcb->perm & D_DELETE ) == 0 )
109     ERR( DME_NODELPRM )
110  if( ( options & D_SELECT ) != 0 && ( vcb->perm & D_SELECT ) == 0 )
111     ERR( DME_NOSELPRM )
112  if( ( options & D_INSERT) != 0 && ( vcb->perm & D_INSERT ) == 0 )
113     ERR( DME_NOINSPRM )
114  if( ( options & D_UPDATE ) != 0 && ( vcb->perm & D_UPDATE) == 0 )
115     ERR( DME_NOUPDPRM )
116
117  dbstatus.dbparm= 0;
118
119  /* All cool so far, prepare the message */
120  dbstatus.dbimmediate= FALSE;
121
122  if( ( cursor= (CURSOR *) malloc( sizeof(CURSOR) ) ) == NULL )
123     ERR(DME_NOMEM);
124  (void)memset( cursor,'\0',sizeof(CURSOR) );
125
126  /* fill it in */
127  cursor->flags= options;
128  cursor->updatenum= cursor->updatecnt= updatenum;
129  cursor->vcb= vcb;
130  cursor->cols= (COLDESC *)( (char *)vcb+sizeof(VCB) );
131  cursor->status= DMS_FREE;
132  cursor->curcol= cursor->curcolnul= 0;
133  cursor->rdata= NULL;
134  cursor->rdelbuf= NULL;
135  cursor->hkey= 0;
136  cursor->memoff= vcb->dmmsg.memoff;
137
138  if( rdsize < 0 && (options & D_SELECT) != 0 ) ERR(DME_INCOMP)
139  if( updatenum <= 0 && (options & (D_UPDATE | D_INSERT)) != 0) ERR(DME_INCOMP)
140  if( (options & D_INSERT) != 0 ) bulknum= cursor->vcb->bulknum;
141
142  /* a release bufer must always be present */
143
144  size= sizeof( DMSBUF )+bulknum*sizeof(BULKREL)+4;
145  if( (options & D_SELECT) == 0 || (options & D_DELETE) != 0 )
146     size += DEFWHERESZ;
147
148  if( (bufp= cursor->rdelbuf= (DMSBUF *) Alloc( size,(options & SUSP) ) )
149     == NULL) ERR(DME_NOMEM)
150  (void)memset( bufp,'\0',size );
151  (void)strcpy( (char *)bufp,DMSS );
152  *( (uint32 *)( (char *)bufp+size-4) )= END_MARK;
153
154  bufp->dmmsg.key= Keypack('x','e','l','r' );
```

```
155    bufp->bufsize= size;
156    bufp->dmmsg.trisize= bufp->bufsize-MSGID_SIZE-sizeof(keyword)-
157                         2*sizeof(long);
158    bufp->next= NULL;
159    bufp->lock= 0;
160    bufp->access= 0;
161    bufp->pcpos= sizeof(DMSBUF)+bulknum*sizeof(BULKREL);
162    bufp->pcsize=  size - ( sizeof( DMSBUF )+bulknum*sizeof(BULKREL)+4 );
163    bufp->pcep= (bufp->pcsize) ? ADBEGIN : 0;
164    bufp->cursor= cursor;
165    bufp->dmmsg.sesid= vcb->dmmsg.sesid;
166    bufp->dmmsg.memoff= vcb->dmmsg.memoff;
167    bufp->dmmsg.ctxtid= vcb->dmmsg.ctxtid;
168    bufp->dmmsg.flags = vcb->dmmsg.flags & DMS_SYSTABLE;
169    bufp->offset= sizeof(DMSBUF);
170    bufp->tag= 0;
171    bufp->rid= 0;
172    bufp->hkey= 0;
173
174    /* allocate the read buffer */
175    if( rdsize < 0 || (options & D_SELECT) == 0 ) {
176      cursor->rdbuf = NULL; cursor->rdsize= 0;
177    }
178    else {
179      cursor->rdsize= (vcb->fixsize + rdsize+3) & -3;
180
181      size= sizeof(DMSBUF) + cursor->rdsize + DEFWHERESZ+4;
182      if( (bufp= cursor->rdbuf= (DMSBUF *) Alloc( size,(options & SUSP) ) )
183          == NULL) ERR(DME_NOMEM)
184      (void)memset( bufp,'\0',size );
185      (void)strcpy( (char *)bufp,DMSS );
186      *( (uint32 *)( (char *)bufp+size-4) )= END_MARK;
187
188      cursor->rdata= (char *)bufp + sizeof( DMSBUF );
189      bufp->dmmsg.key= Keypack('f','e','t','r' );
190      bufp->bufsize= sizeof(DMSBUF)+cursor->rdsize+DEFWHERESZ+4;
191      bufp->dmmsg.trisize= bufp->bufsize-MSGID_SIZE-sizeof(keyword)-
192                           2*sizeof(long);
193      bufp->next= NULL;
194      bufp->lock= 0;
195      bufp->access= 0;
196      bufp->pcpos= sizeof(DMSBUF)+cursor->rdsize;
197      bufp->pcsize= DEFWHERESZ;
198      bufp->cursor= cursor;
199      bufp->dmmsg.sesid= vcb->dmmsg.sesid;
200      bufp->dmmsg.memoff= vcb->dmmsg.memoff;
201      bufp->dmmsg.ctxtid= vcb->dmmsg.ctxtid;
202      bufp->dmmsg.flags = vcb->dmmsg.flags & DMS_SYSTABLE;
203      bufp->tag= 0;
204      bufp->rid= 0;
205      bufp->hkey= 0;
206      bufp->pcep= ADBEGIN;
207      bufp->offset= sizeof(DMSBUF);
208    }
209
210    /* Allocate the update buffers, and chain them together */
211    if( (options & (D_UPDATE | D_INSERT) ) != 0 ) {
212      cursor->ubuf= NULL;
213      cursor->updatesize= (updatesize+3) & -3;
214      size= sizeof( DMSBUF )+cursor->updatesize+4;
215      if( cursor->rdbuf == NULL && (options & D_DELETE)== 0) size += DEFWHERESZ;
216
217      for( cursor->updatenum= 0; cursor->updatenum < updatenum;
218                                 (cursor->updatenum)++ )      {
219        if( (bufp= (DMSBUF *) Alloc( size,(options & SUSP) ) ) == NULL)
220          ERR(DME_NOMEM)
221        (void)memset( bufp,'\0',size );
222        (void)strcpy( (char *)bufp,DMSS );
223        *( (uint32 *)( (char *)bufp+size-4) )= END_MARK;
224
225        bufp->dmmsg.key= Keypack('u','p','d','r' );
226        bufp->bufsize= size;
227        bufp->dmmsg.trisize= bufp->bufsize-MSGID_SIZE-sizeof(keyword)-
228                             2*sizeof(long);
229        bufp->next= NULL;
230        bufp->lock= 0;
231        bufp->access= 0;
232        bufp->pcpos= sizeof(DMSBUF)+cursor->updatesize;
233        bufp->pcsize= size-sizeof(DMSBUF)-4-cursor->updatesize;
234        bufp->cursor= cursor;
```

```
235        bufp->dmmsg.sesid= vcb->dmmsg.sesid;
236        bufp->dmmsg.memoff= vcb->dmmsg.memoff;
237        bufp->dmmsg.ctxtid= vcb->dmmsg.ctxtid;
238        bufp->dmmsg.flags = vcb->dmmsg.flags & DMS_SYSTABLE;
239        bufp->offset= sizeof(DMSBUF);
240        bufp->tag= 0;
241        bufp->rid= 0;
242        bufp->hkey= 0;
243        bufp->pcep= (bufp->pcsize) ? ADBEGIN : 0;
244
245        if( cursor->ubuf == NULL ) cursor->ubuf= bufp;
246        else prevbufp->next= bufp;
247        prevbufp= bufp;
248      }
249    }
250
251    /* hang the cursor in the chain */
252    prevcursor = vcb->cursor;
253    vcb->cursor= cursor;
254    cursor->next= prevcursor;
255
256    /* Place the default where clause in cursor */
257    if( FastWhere( cursor,0,"",0)  == FAILURE ) ERR( dbstatus.dberror )
258
259    /* all done */
260    dbstatus.dbexception= 0;
261    return( cursor );
262
263    /* errors */
264    ERRSET;
265
266    /* recover the memory */
267    if( cursor != NULL ) {
268      if( cursor->rdelbuf != NULL ) Free( cursor->rdelbuf );
269      if( cursor->rdbuf != NULL ) Free( cursor->rdbuf );
270      bufp= cursor->ubuf;
271      while( bufp != NULL ) {
272        prevbufp= bufp->next; Free( bufp ); bufp = prevbufp;
273      }
274      free( cursor );
275    }
276    return( NULL );
277 }
```

PROGRAM LISTING B

```
1  /*****************************************************************
2
3     Copyright 1987. All Rights Reserved Computer X Inc.
4
5     This software is provided to the purchaser under a license which
6     forbids reproduction in whole or in part except as provided in
7     writing by Computer X Inc.
8
9     Module         : strow.c 1.5  strow.c
10    Date submitted : 89/04/25 12:13:03
11    Author         : Valentin Oprescu
12    Origin         : cX
13    Description    : DMS application library: store row(s).
14
15 *****************************************************************/
16 #ident "@(#) strow.c:1.5"
17
```

```
18 #include <memory.h>
19 #include <string.h>
20 #include <ctype.h>
21 #include <cX.h>
22 #include <dms.h>
23 #include <dms_codes.h>
24 #include <dm/dmsbase.h>
25 #include <dm/dmsadef.h>
26 #include <dm/dmswhere.h>
27
28 /*>
29 ************************************************************************
30 *
31 *      procedure name: StoreRow
32 *      ===============
33 *
34 * return value:  SUCCESS/FAILURE
35 * ............
36 *
37 * functional description: see IFG.
38 * ......................
39 *
40 * side effects: None.
41 * ............
42 *
43 * residence: DMS application library.
44 * .........
45 *
46 * release compatibility:
47 * ......................
48 *
49 * written by            date
50 * ..........           ........
51 * V. Oprescu           07/28/87
52 *
53 * modified by          date       SPR#       reason for modification
54 * ...........          ........   .......    .......................
55 */
56
57 bool StoreRow( cursor,mode,ridp,tag )
58
59    CURSOR  *cursor;                    /* cursor */
60    uint32  mode;                       /* dispositions */
61    int32   tag;                        /* user specified tag for ASYNC */
62    RID     *ridp;                      /* RID */
63
64 /************************************************************************
65 <*/
66 {
67    TRACE("StoreRow")
68    uint32 i;              /* scratch variable */
69    DMSBUF *tempbuf;
70    DMSBUF *bufptr;
71    int32  size;
72
73    bool FetchRow();
74    bool dms_defval();
75
76    dbstatus.dbexception= dbstatus.dberror= dbstatus.dbparm= 0;
77    dbstatus.dbimmediate= TRUE;
78
79    /* cursor better be here */
80    if( ((cursor->status & DMS_NOTHERE) != 0 &&
81        (cursor->status & DMS_FROZEN) == 0 ) ||
82        cursor->ubuf == NULL) ERR(DME_NOTHERE)
83
84    /* ... and have something in it */
85    if( cursor->status == DMS_FREE ) ERR( DMX_EMPTY )
86
87    /* check the options */
88    dbstatus.dbparm= 2;
89    if( (mode & ~( D_IMMEDIATE | D_ASYNC | D_CURRENT | D_ALL | D_FIRST |
90                  D_NORELEASE | D_RETAIN | D_DROP )) != 0 )  ERR(DME_BADOPT)
91
92    if( (mode & D_DROP) != 0 && (mode & D_RETAIN) != 0 ) ERR(DME_INCOMP)
93
94    i = ( mode & D_IMMEDIATE ) ? DMS_IMMEDIATE : 0;
95    switch( mode & ~( D_IMMEDIATE | D_ASYNC | D_NORELEASE |
96                     D_DROP | D_RETAIN ) ) {
97      case D_CURRENT:
```

```
 98        i |= ( mode & D_NORELEASE ) ? DMS_NORELEASE : 0;
 99        if( cursor->rdbuf != NULL ) {
100          if( (mode & D_NORELEASE) == 0 ) cursor->rdbuf->offset= sizeof(DMSBUF);
101        }
102        if( (cursor->status & DMS_NEWROW) != 0 && cursor->ubuf->rid == 0 &&
103            (cursor->status & DMS_FROZEN) == 0) {
104          if( cursor->vcb->bucketnum >= 1 && cursor->hkeyn == 0 )
105            ERR( DME_NOKEY )
106          i |= DMS_INSBUF;
107        }
108        else if( (cursor->status & DMS_OLDROW) != 0 ) {
109          if( (cursor->flags & D_UPDATE) == 0 ) ERR( DME_NOUPDCUR )
110          if( cursor->rdbuf->access != DMS_UPD ) ERR(DME_NOUPDACC)
111          if( cursor->rdbuf->lock == DMS_NL ) ERR( DME_WEAKLOCK )
112
113          if( (mode & D_DROP) != 0 ) i |= DMS_DROP;
114          cursor->ubuf->dmmsg.memoff= cursor->rdbuf->dmmsg.memoff;
115        }
116        else if( (cursor->status & DMS_ALL) != 0 ) {
117          ERR( DME_BADOPT )
118        }
119        if( (mode & D_RETAIN) != 0 ) i |= DMS_RETAIN;
120        break;
121
122      case D_ALL:
123      case D_FIRST:
124        if( (cursor->status & DMS_ALL ) == 0 ) ERR(DME_NOALL)
125        /* at least a SR lock is required */
126        if( cursor->vcb->lock < DMS_SR ) ERR( DME_WEAKLOCK )
127        if( (mode & D_NORELEASE) != 0 ) ERR(DME_INCOMP)
128        /* no bulks allowed here */
129        if( cursor->rdelbuf->offset != sizeof(DMSBUF) ) ERR( DME_NOBULK )
130        /* the pseudocode should be in place */
131        tempbuf= cursor->rdbuf;
132        if( tempbuf == NULL ) tempbuf= cursor->rdelbuf;
133        if( tempbuf != NULL ) {
134          size= Max( 0, tempbuf->pcsize - cursor->ubuf->pcsize ) +
135                cursor->ubuf->bufsize;
136          /* move the pseudo-code from tempbuf to the update buffer */
137          if( size > cursor->ubuf->bufsize ) {
138            if( (bufptr= (DMSBUF *)Realloc( (char *)(cursor->ubuf),
139                 size,cursor->flags & SUSP ) ) == NULL ) ERR(DME_NOMEM)
140            cursor->ubuf= bufptr;
141            cursor->ubuf->bufsize= size;
142            cursor->ubuf->pcsize= tempbuf->pcsize;
143          }
144          (void)memcpy( (char *)(cursor->ubuf)+cursor->ubuf->pcpos,
145                        (char *)tempbuf+tempbuf->pcpos,
146                        tempbuf->pcsize );
147          *( (uint32 *)( (char *)(cursor->ubuf) + size -4 ))= END_MARK;
148          cursor->ubuf->dmmsg.trisize= size- MSGID_SIZE- 3*sizeof(long);
149          cursor->ubuf->cksum= tempbuf->cksum;
150        }
151        cursor->ubuf->pcep= ADBEGIN;
152        if( (mode & D_FIRST) != 0 ) i |= DMS_ONCE;
153        tempbuf->cksum ^=
154          *(uint32 *)((char *)(cursor->ubuf)+cursor->ubuf->pcpos+ADCTLFLG);
155        *(uint32 *)((char *)(cursor->ubuf)+cursor->ubuf->pcpos+ADCTLFLG)=
156          DMS_UPDROW | ((mode & D_FIRST) ? DMS_ONCE : 0);
157        tempbuf->cksum ^=
158          *(uint32 *)((char *)(cursor->ubuf)+cursor->ubuf->pcpos+ADCTLFLG);
159        i |= ( DMS_WHERE | DMS_LOOKAHEAD );
160        /* fill in defered references */
161        if( *( (uint32 *)((char *)(cursor->ubuf)+cursor->ubuf->pcpos+ADNINDP) )
162            != 0 ) {
163          if( dms_defval(&(cursor->ubuf)) != SUCCESS ) ERR( dbstatus.dberror )
164        }
165        break;
166      default:
167        ERR( DME_INCOMP )
168    }
169
170    dbstatus.dbparm= 0;
171    dbstatus.dbimmediate= FALSE;
172
173    cursor->ubuf->dmmsg.flags = i;
174    cursor->ubuf->hkey= (i & DMS_INSBUF) ? cursor->hkeyn : cursor->hkey;
175    tempbuf= cursor->ubuf;
176    cursor->ubuf= tempbuf->next;
```

```
177      (void)strcpy( tempbuf,DMSS );
178      tempbuf->cksum ^= cursor->ubuf->hkey;
179      tempbuf->dmmsg.memoff= cursor->memoff;
180      tempbuf->dmmsg.status= 0;
181      tempbuf->rid= 0;
182
183      if( mode & D_ASYNC ) {
184        tempbuf->tag= tag;
185        if( (tempbuf->dmmsg.flags & DMS_NORELEASE) == 0 )
186           cursor->status= DMS_FREE;
187        else cursor->status |= DMS_FROZEN;
188
189        if( cursor->ubuf == NULL ) {
190          cursor->status |= DMS_NOTHERE;
191          cursor->status &= -( DMS_STOREBLE );
192        }
193        else {
194          /* move the pseudo-code from tempbuf to the new update buffer */
195          if( tempbuf->pcsize > 0 ) {
196            if( cursor->ubuf->bufsize < (size= tempbuf->bufsize) ) {
197              if( (bufptr= (DMSBUF *) Realloc( (char *)cursor->ubuf, size,
198                           cursor->flags & SUSP ) ) == NULL ) ERR(DME_NOMEM)
199              cursor->ubuf= bufptr;
200              cursor->ubuf->bufsize= size;
201            }
202            cursor->ubuf->pcpos= tempbuf->pcpos;
203            cursor->ubuf->pcsize= tempbuf->pcsize;
204            (void)memcpy( (char *)(cursor->ubuf)+cursor->ubuf->pcpos,
205                          (char *)tempbuf+tempbuf->pcpos,
206                          tempbuf->pcsize );
207            *( (uint32 *)( (char *)(cursor->ubuf) + size -4 ))= END_MARK;
208            cursor->ubuf->dmmsg.trisize= size- MSGID_SIZE- 3*sizeof(long);
209            cursor->ubuf->pcep= ADBEGIN;
210          }
211          cursor->ubuf->cksum= tempbuf->cksum;
212        }
213        CONN_CHAN( &(cursor->vcb->msmconn) )= (uint32)(cursor);
214        Put( DIRECT,&(cursor->vcb->msmconn),tempbuf );
215        (cursor->updatecnt)--;
216        if( ridp != NULL ) *ridp= 0;
217        return( SUCCESS );
218      }
219      else {
220        if( (tempbuf = (DMSBUF *)Call(DIRECT,&(cursor->vcb->msmconn),tempbuf,
221                           NULL,NULL) ) == NULL ) ERR( DME_CONNAV );
222        tempbuf->cksum ^= cursor->ubuf->hkey;
223        cursor->memoff= tempbuf->dmmsg.memoff;
224        tempbuf->next= cursor->ubuf;
225        cursor->ubuf= tempbuf;
226        if( (cursor->ubuf->dmmsg.flags & DMS_INSBUF) != 0 &&
227            cursor->rdbuf != NULL ) cursor->rdbuf->rid= cursor->ubuf->rid;
228        if( (cursor->ubuf->dmmsg.flags & DMS_NORELEASE) != 0 ) {
229          if( cursor->ubuf->rid != 0 ) cursor->ubuf->offset= sizeof(DMSBUF);
230          if( (cursor->ubuf->dmmsg.flags & DMS_INSBUF) != 0 &&
231              cursor->rdbuf != NULL ) {
232            cursor->status= DMS_OLDROW | DMS_STOREBLE;
233            cursor->rdbuf->dmmsg.memoff= cursor->ubuf->dmmsg.memoff;
234            cursor->rdelbuf->offset= sizeof(DMSBUF);
235            if( cursor->ubuf->dmmsg.status < DME_BASE )
236              (void)FetchRow( cursor,D_CURRENT | D_UPDATE | D_EXCLUSIVE | D_PEEK,
237                              0,NULL );
238          }
239        }
240        else {
241          cursor->status= DMS_FREE;
242        }
243        if( cursor->ubuf->dmmsg.status > DME_BASE ) {
244          dbstatus.dberror= cursor->ubuf->dmmsg.status;
245          goto error;
246        }
247        else if( dbstatus.dbexception == 0 )
248          dbstatus.dbexception= cursor->ubuf->dmmsg.status;
249      }
250      (void)dms_event();
251      cursor->vcb->nofrecs= cursor->ubuf->nofrecs;
252      if( ridp != NULL ) *ridp= cursor->ubuf->rid;
253      return( cursor->ubuf->rid ? SUCCESS : FAILURE );
254
255      /* errors */
256      ERRSET;
```

```
257   return( FAILURE );
258 )
```

PROGRAM LISTING C

```
1  /*******************************************************************
2
3      Copyright 1987. All Rights Reserved Computer X Inc.
4
5      This software is provided to the purchaser under a license which
6      forbids reproduction in whole or in part except as provided in
7      writing by Computer X Inc.
8
9      Module         : msgcheck.c 1.3  msgcheck.c
10     Date submitted : 89/01/10 16:35:46
11     Author         : Valentin Oprescu
12     Origin         : cX
13     Description    : DMS application library: check async return.
14
15 *******************************************************************/
16 #ident "@(#) msgcheck.c:1.3"
17
18 #include <memory.h>
19 #include <string.h>
20 #include <ctype.h>
21 #include <cX.h>
22 #include <dms.h>
23 #include <dms_codes.h>
24 #include <dm/dmsbase.h>
25 #include <dm/dmsadef.h>
26
27 /*>
28 *******************************************************************
29 *
30 *      procedure name: MsgCheck
31 *      ===============
32 *
33 * return value:  pointer to message if non-DMS, NULL if DMS.
34 * ------------
35 *
36 * functional description: see IFG.
37 * ----------------------
38 *
39 * side effects: the initiated operations are completed, as if there were
40 * ------------     synchronous.
41 *
42 * residence: DMS application library.
43 * ---------
44 *
45 * release compatibility:
46 * ---------------------
47 *
48 * written by              date
49 * ----------              ----
50 * V. Oprescu              07/29/87
51 *
52 * modified by             date       SPR#       reason for modification
53 * -----------             ----       ----       ----------------------
54 */
55
56 char *MsgCheck( msgin )
57
58    char *msgin;              /* input message */
59
60 /*******************************************************************
```

```
61  <*/
62  {
63    TRACE("MsgCheck")
64
65    static char *fetchname = "FetchRow";
66    static char *relname = "ReleaseRow";
67    static char *delname = "DeleteRow";
68    static char *storename = "StoreRow";
69
70    CURSOR *cursor;
71    DMSBUF *ubuf;
72
73  #define msgdms ((DMSBUF *)msgin)
74
75    dbstatus.dbexception= dbstatus.dberror= dbstatus.dbparm= 0;
76
77    if( msgin == NULL ) ERR(DME_ILLVAL)
78    if( *(msgin+4) != '\0' ) return( msgin );
79    if( strcmp( msgin,DMSR ) != 0 ) return( msgin );
80
81    cursor= msgdms->cursor;
82    switch( msgdms->dmmsg.key ) {
83
84      case Keypack('u','p','d','r'):
85        if( cursor->ubuf == NULL ) {
86          msgdms->next= cursor->ubuf;
87          cursor->ubuf= msgdms;
88          cursor->status &= -( DMS_NOTHERE );
89          if( (msgdms->dmmsg.flags & DMS_NORELEASE) == 0 ) {
90            cursor->status= DMS_FREE;
91            if( cursor->rdelbuf != NULL )
92              cursor->rdelbuf->offset= sizeof( DMSBUF );
93          }
94          else if( cursor->status != DMS_FREE ) {
95            if( (cursor->status & DMS_NEWROW) != 0 ) {
96              cursor->status |= DMS_STOREBLE;
97              cursor->ubuf->offset= cursor->rdelbuf->offset= sizeof(DMSBUF);
98              if( (cursor->status & DMS_FROZEN) == 0 ) {
99                cursor->ubuf->dmmsg.flags = DMS_INSBUF;
100               cursor->ubuf->rid = 0;
101             }
102           }
103           else if( (cursor->status & DMS_ALL) != 0 &&
104               cursor->vcb->lock >= DMS_SR ) cursor->status |= DMS_STOREBLE;
105           else if( cursor->ubuf->rid != 0 ) cursor->status |= DMS_STOREBLE;
106         }
107       }
108       else {
109         msgdms->next= cursor->ubuf->next;
110         cursor->ubuf->next= msgdms;
111       }
112       msgdms->offset= sizeof( DMSBUF );
113       (cursor->updatecnt)++;
114       dbstatus.dbfunction= storename;
115       break;
116
117     case Keypack('f','e','t','r'):
118       cursor->rdbuf= msgdms;
119       cursor->rdata= msgin+sizeof( DMSBUF );
120       cursor->rdbuf->offset= sizeof(DMSBUF);
121       cursor->rdbuf->pcep= 0;
122       if( cursor->rdbuf->rid == 0 ) cursor->status= DMS_FREE;
123       else {
124         cursor->status= DMS_OLDROW;
125         if( msgdms->access == DMS_UPD && msgdms->lock >= DMS_SW )
126           cursor->status |= DMS_STOREBLE;
127       }
128       dbstatus.dbfunction= fetchname;
129       break;
130
131     case Keypack('x','e','l','r'):
132       cursor->rdelbuf= msgdms;
133       cursor->rdelbuf->offset= sizeof(DMSBUF);
134       if( (msgdms->dmmsg.flags & DMS_RELBUF) != 0 ) {
135         dbstatus.dbfunction= relname;
136         if( (msgdms->dmmsg.flags & DMS_WHERE) != 0 ) {
137           msgdms->dmmsg.memoff= cursor->memoff=
138             cursor->vcb->dmmsg.memoff;
139           if( cursor->rdbuf != NULL )
140             cursor->rdbuf->dmmsg.memoff= cursor->memoff;
```

```
141        for( ubuf= cursor->ubuf; ubuf != NULL; ubuf= ubuf->next )
142            ubuf->dmmsg.memoff= cursor->memoff;
143        }
144     }
145     else dbstatus.dbfunction= delname;
146     msgdms->dmmsg.flags= 0;
147     cursor->status= DMS_FREE;
148     break;
149
150   default:
151     return( msgin );
152   }
153
154   dbstatus.dbtag= msgdms->tag;
155   msgdms->cksum ^= msgdms->hkey;
156   cursor->memoff= msgdms->dmmsg.memoff;
157   if( msgdms->dmmsg.status < DME_BASE )
158       dbstatus.dbexception= msgdms->dmmsg.status;
159   else dbstatus.dberror= msgdms->dmmsg.status;
160   if( dbstatus.dberror == 0 ) cursor->vcb->nofrecs= msgdms->nofrecs;
161   (void)dms_event();
162   return( NULL );
163
164   /* errors */
165   ERRSET;
166   return( msgin );
167 }
```

What is claimed is:

1. In a data-processing system comprising a producer process generating data, a database management system responsive to said producer process and controlling the storage of said data in an associated database, a method for storing said data in said database comprising the steps of:

a) receiving a first portion of said data from said producer process;

b) placing said first portion of said data in a first of a plurality of data buffers;

c) transferring said first portion of data from said first buffer into said database while receiving a second portion of said data from said producer process and placing said second portion of said data in a second of a plurality of data buffers; and d) transferring said second portion of data from said second buffer into said database.

2. The method recited in claim 1, wherein steps b) and c) comprise assigning unique tags to the entire contents of said data buffers as said portions of data are placed therein.

3. The method recited in claim 2, further comprising the step of generating an error message comprising the unique tag of the corresponding data buffer contents if the step of transferring said data results in an error.

4. In a data-processing system comprising a producer process generating data, a database management system responsive to said producer process and controlling the storage of said data in an associated database, a method for storing said data in said database comprising the steps of:

a) receiving a first portion of said data from said producer process;

b) placing said first portion of said data in a first of a plurality of data buffers;

c) transferring said first portion of data from said first buffer into said database while receiving a second portion of said data from said producer process and placing said second portion of said data in a second of a plurality of data buffers;

d) transferring said second portion of data from said second buffer into said database while receiving a third portion of said data from said producer process and placing said third portion of said data in said first of said plurality of data buffers.

5. The method recited in claim 4, wherein steps b) through d) comprise assigning unique tags to the entire contents of said data buffers as said portions of data are placed therein.

6. The method recited in claim 5, further comprising the step of generating an error message comprising the unique tag of the corresponding data buffer contents if the step of transferring said data results in an error.

7. In a data-processing system comprising a producer process generating data, a database management system responsive to said producer process and controlling the storage of said data in an associated database, a method for storing said data in said database comprising the steps of:

a) receiving a first portion of said data from said producer process;

b) placing said first portion of said data in a first of a plurality of data buffers;

c) transferring said first portion of data from said first buffer into said database while receiving a second portion of said data from said producer process and placing said second portion of said data in a second of a plurality of data buffers;

d) transferring said second portion of data from said second buffer into said database while receiving a third portion of said data from said producer process and placing said third portion of said data in an empty one of said plurality of data buffers;

e) repeating steps a) through d) until all of said data has been transferred to said database.

8. The method recited in claim 7, wherein steps b) through d) comprise assigning unique tags to the entire contents of said data buffers as said portions of data are placed therein.

9. The method recited in claim 8, further comprising the step of generating an error message comprising the unique tag of the corresponding data buffer contents if the step of transferring said data results in an error.

* * * * *